Sept. 23, 1969   M. McINTYRE ET AL   3,468,186
REMOTE CONTROL REARVIEW MIRROR
Filed Aug. 14, 1967   2 Sheets-Sheet 1
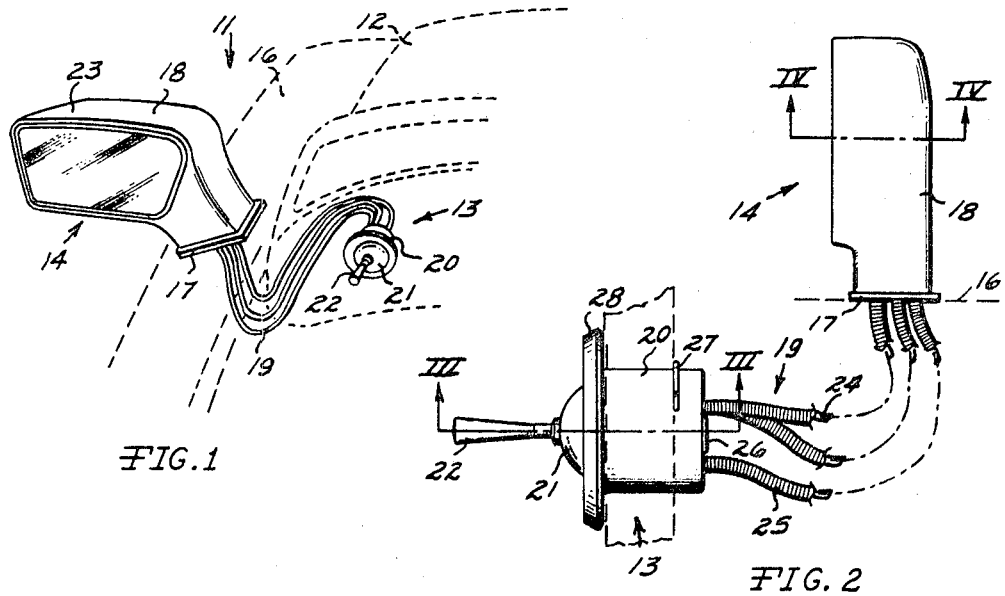
FIG. 1
FIG. 2
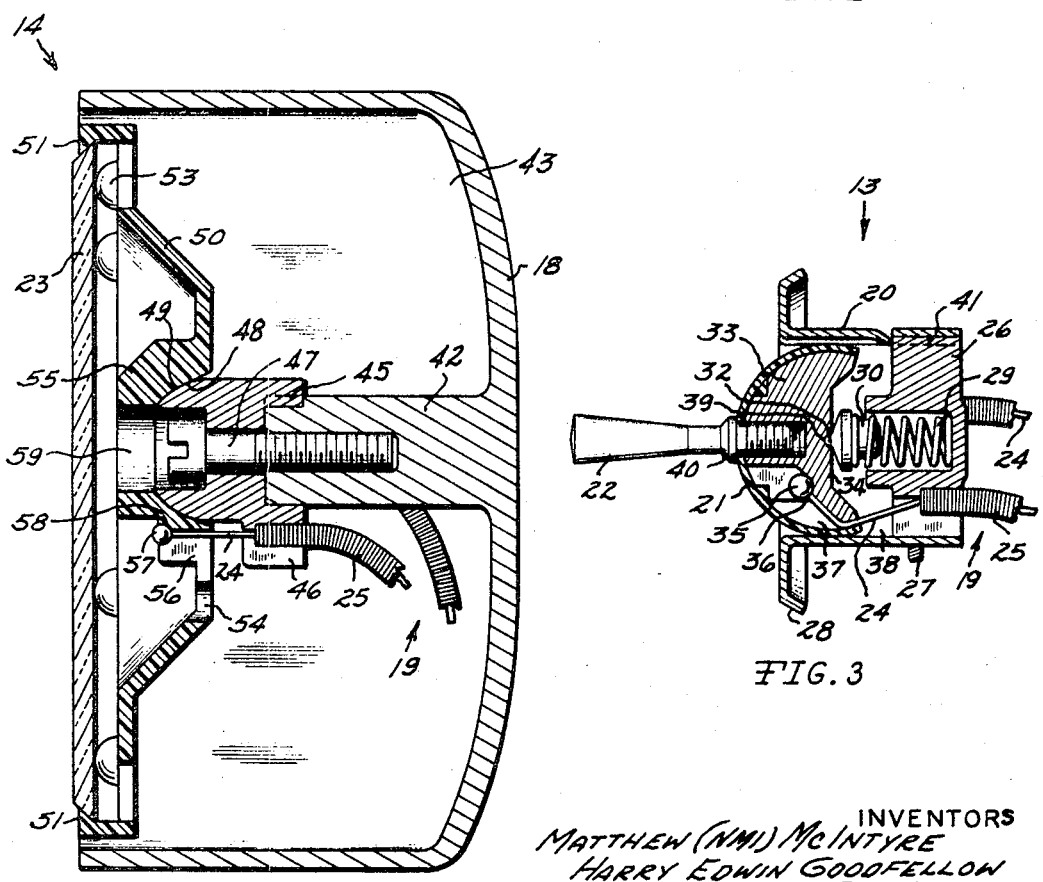
FIG. 3
FIG. 4
INVENTORS
MATTHEW (NMI) McINTYRE
HARRY EDWIN GOODFELLOW
HERBERT ROY JAFFE
BY
Miller Morris Pappas & McLeod
ATTORNEYS

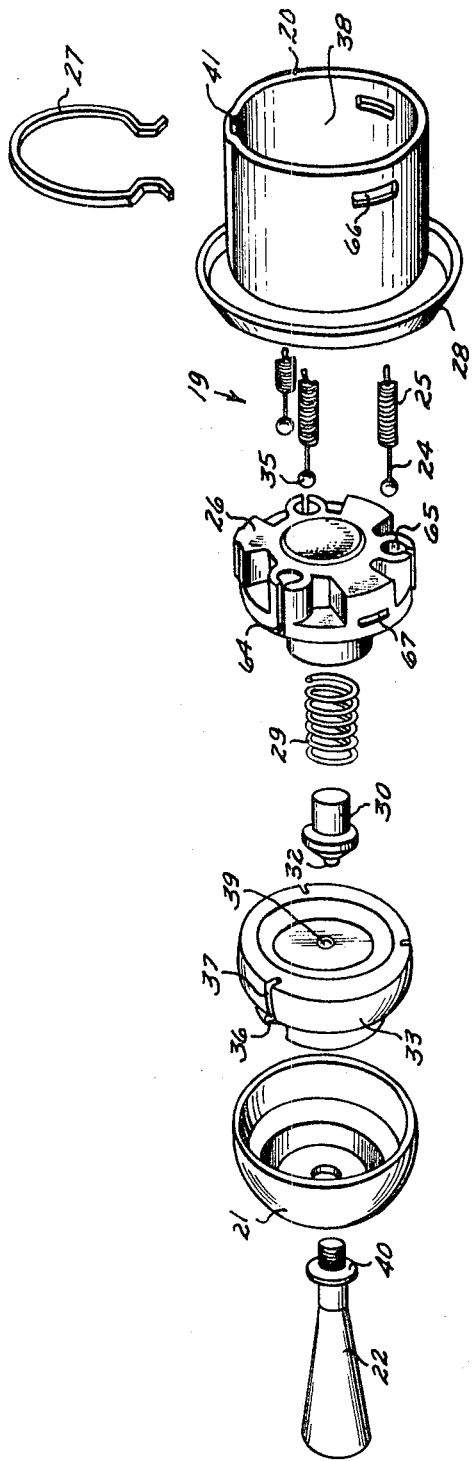

United States Patent Office 3,468,186
Patented Sept. 23, 1969

3,468,186
REMOTE CONTROL REARVIEW MIRROR
Matthew McIntyre, Madison County, Tenn., Harry Edwin Goodfellow, Kent County, Mich., and Herbert Roy Jaffe, Nassau County, N.Y., assignors to Jervis Corporation, Grandville, Mich., a corporation of Michigan
Filed Aug. 14, 1967, Ser. No. 660,410
Int. Cl. F16c 1/20
U.S. Cl. 74—501                                6 Claims

ABSTRACT OF THE DISCLOSURE

An improvement in remote control wire or cable operated rearview mirrors in which a single piece mirror housing incorporates pedestal and guide posts cooperating with a snap-in resin mirror support, and at the manual remote actuator end the pivotal element is allowed to float in a tubular escutcheon housing thereby adjusting by lineal and axial positioning of the ball to accommodate mounting variables arising from the random length of the wires or cables while extending angle adjustment range or throw of the control knobs.

---

The present invention is directed to improvements in remote control wire or cable operated rearview mirrors as primarily used in automobiles so as to allow the driver of the automobile to adjust the outside mirror setting from inside the automobile. While useful in any mechanical remote control setting the principal usefulness is in remote control rearview mirrors. Such devices are exemplified by reference to U.S. Letters Patent 2,931,245 to Edwin B. Jacobson. The improvements herein are directed to a new useful and inventive single piece mirror housing which integrally includes mounting and stabilizing elements; a new and useful snap-in mirror mounting or frame which incorporates glass support, pivot structure, and stabilizing provisions. In the actuator assembly, the pivot portion is controllably or axially floated in a tubular escutcheon member so as to accommodate variances in cable or wire installations within a given model range of automobiles and so that the "throw" or angular movement of the pivot is maximized to accommodate occasional off-center indexing of the mirror and actuator without impairing the angular movement desired. In other respects the improvement in remote mirror structure is mostly unobvious simplification over prior known structures and the resulting unit is more stable at high speeds and easier to install and service while providing maximum of control movement. Collaterally, the actuator assembly, by virtue of the resin to metal close fit in the tubular escutcheon effectively seals the actuator in avoidance of air leaks from outside the passenger enclosure into the passenger enclosure of the vehicle.

Accordingly the principal object of the present invention is to provide a simpler more stable cable operated remote control rearview mirror structure.

Another object is to provide a one-piece mirror housing which includes integral pedestal element and guide posts.

Another object is to provide a resin snap-in mirror support element which incorporates the mirror pivot structure and is thereby secured to the pedestal element.

Another object is to provide a new and simplified cable actuator structure housed in an escutcheon tube so that the pivot is allowed to axially "float" therein and so that the operating lever is allowed maximum universal traverse within the range desired by automotive fabricators despite slight angular variances inherent in the axial or center location of the operating lever handle or pendent.

Still another object is to provide an actuator which seals against air leakage into the vehicle.

Other objects including overall economy and fabricating simplicity will be obvious to those skilled in the art as the description proceeds.

GENERAL DESCRIPTION

In general two assemblies are provided, a universally movable actuator unit which is located inside an automobile, and a universally mounted mirror outside of an automobile. Operating connection between the two assemblies is by means of cables, lineally and relatably movable in sheaths so that upon movement of the actuator element, the mirror will mimic the displacement of the actuator. Three control vectors provide accurate universal mimicry in all desired attitudes within the limits of angular "throw" imposed by the structure. In the past this "throw" has not exceeded about 20 degrees from center. The present structure is designed to accomplish a 30 degree "throw" or better from center. As will be appreciated by reference to U.S. Letters Patent 2,931,245, since the mirror is directed toward the rear of the driver and as the driver seeks to accomplish direct control at the actuator, it is equal to connect the lower cable in the actuator to the upper vector position in the mirror. The furthest right cable in the actuator is then connected to the furthest left vector position in the mirror, and the furthest left cable in the actuator is connected to the furthest right vector position in the mirror. Then, if the driver moves the inside operator handle downward the mirror is moved to reflect downwardly. If the handle is moved to the right the mirror is moved to reflect to the right. If the handle is moved to the left then the mirror is pivoted correspondingly to reflect to the left. The core cables are always in equal stress and the movement of one of the cables gives rise to corresponding balancing movement in the other of the cables.

A resin or plastic material such as polyethylene is integrally formed as a mirror support to include a framing lip for a mirror and back-up padding to the mirror. A spherical socket is provided in the mirror support and about this socket cable connection openings are provided in 120 degree intervals where the three wire system is employed. The socket nestably and universally engages a ball or male spherical element which is integral with three holding sleeves. These sleeves crimp upon the ends of the sheath elements which surround the cables or wires and the wire or cable cores extend to connection with the mirror support element. The ball or spherical element is secured in an index relation to a pedestal projecting from substantially the center of the one-piece mirror housing or case. Flanking the pedestal are two guide posts. These extend up and into apertures or slots provided in the resin mirror frame at the back thereof and assist as stabilizing guides in assembly and operation steadying the mirror while allowing pivotal movement. The cables, inside their tubular sheaths pass through the one-piece housing an circuitously through and around various parts of the automobile to the actuator assembly. An escutcheon tube, usually decoratively flanged as it appears from the interior of an automobile, houses the actuator assembly. The rear portion of the tubular escutcheon element is keyed orientably to receive an actuator base element. A circlip penetrating the tubular escutcheon secures the base element against axial displacement. Cylindrical openings are provided in 120 degree positions defined in the base to receive and securely retain (as by crimping) the actuator ends of the cable sheaths. The cables or wire cores extend axially through the cylindrical openings. An axial spring pocket coaxial with the tubular element is positioned in the base. This pocket retains a compression spring which extends axially therefrom and coaxially into the tubular escutcheon. The outer end of the spring receives an axial guide and the spring impinges on a flange face thereof. The outermost face of the guide is tapered and terminates in a small ball pivot.

A stepped spherical actuator body, truncated to form a flat base portion and slotted to receive the cables in 120 degree locations about the truncation is provided. When the ends of the cable are passed through the slots they are secured against axial displacement from the slots by ball terminal ferrules or terminal upsets socketed in the step of the spherical actuator body. At the center of the base truncation a small indentation is provided against which the spring load pivot is applied thereby tensioning all of the cores or cables in the system equally in accord with the compression strength of the spring. A spherical resin shroud is press fitted over the spherical actuator body and substantially concealing all of the slots and terminal ends of the wires or cables. The diameter of the spherical shroud is substantially the same exterior diameter as the interior of the tubular escutcheon so that a close but moving friction fit is accomplished with attendant seal. The resin may be polypropylene, or a fluorinated compound sold under the trade name "Teflon" or the like and selected preferably for lubricant-free dimensionally stable properties. An axial threaded opening is provided in one end of the spherical body element and a corresponding opening is provided in the spherical shroud. This provides thread mounting means for the handle or pendent which extends axially from the end of the spherical body and shroud. The entire assembly is inserted axially into the tubular escutcheon from the rear and the base is locatably secured against rotation by the key way and axially located by the circlip.

The three control wires extend in their sheaths and into a mirror housing remote from the actuator. The housing is preferably a single piece casting secured, for example to the exterior of a body section or door section of an automobile. The housing provides a mirror cavity and includes a center mounting pedestal and two flanking guide posts which stabilize the mirror elements in all attitudes. The one-piece housing avoids problems of connection as between plural housing parts and can be securely gasketed against the automotive body surface. The one-piece housing consequently is more stable and less sensitive to vibrations.

The mirror case or mounting is provided centrally with a female socket which nests for universal movement on the male connector surface.

The case includes a groove or flange at the mirror gripping periphery which urges the mirror into tight snap-in holding relation against integral case stops or supports which cushion the back of the mirror. Hence, replacement of the mirror pane or glass is greatly facilitated as is disassembly of the mirror end details of the remote control mirror structure. The guide posts extend into slot apertures provided through the case so as to impart a resistance to twisting tendencies in the mirror where nonsymmetrical glass is contemplated and at least one of the guide posts is in stabilizing engagement with the case at all times and attitudes. Accordingly the case is made of a sturdy weather resistant but deformable resin material and is integrally cast or formed as by injection molding. This construction, aside from reducing elements in the mirror assembly, results in considerable reduction in vibration and substantially cushions and eliminates a "chatter" vision sometimes observed in remote control mirrors, particularly in situations where non-symmetric glass is employed and the glass mass is unequally oriented in respect to the center mirror pivot.

In the drawings:

FIGURE 1 is a perspective view of a remote control rearview mirror structure in accord with the present invention wherein the actuator is dash mounted and the single piece mirror housing is secured to an external body section and the automobile is indicated in phantom line.

FIGURE 2 is a side elevation view of the remote control rearview mirror structure seen in FIGURE 1 with connecting cables or wires and considered apart from its automotive connection.

FIGURE 3 is a cross section elevation view of the actuator structure and taken on line III—III of FIGURE 2.

FIGURE 4 is a cross section elevation view of the mirror housing and mirror assembly taken on the line IV—IV of FIGURE 2.

FIGURE 5 is an exploded elevation perspective view of the elements and assembly of the actuator.

FIGURE 6 is an exploded elevation perspective view of the elements and assembly in the mirror housing.

SPECIFIC DESCRIPTION

Referring to the drawings and more particularly to FIGURE 1 the remote control mirror structure 11 of the present invention is placed in its usual operative setting in an automobile 12. Two major coordinated assemblies are involved, the actuator structure 13 and the mirror and housing assembly 14. As can be seen, the actuator 13 is secured to the dash or other location inside the vehicle or automobile where it is conveniently accessible to the driver. The mirror assembly 14 is remote from the actuator 13 and external of the vehicle or automobile and is secured to the fender 16 or other body surface, as for example the door of the vehicle 12. A gasket 17 is interposed between mirror housing 18 and the fender 16 so as to assure a leak-proof and vibration secure connection. Fasteners, not shown, provide the connection of housing 18 to automobile 12 in a well-known manner and where access to the fasteners may be obtained through the housing as contrasted with connection from or through the body side of the assembly. Bowden wire assemblies 19 (preferably three in number) are connected so that the sheathed cables or wires are in tension between the actuator 13 and the mirror housing assembly 14. Visible in the vehicle 12 are the tubular escutcheon 20, the spherical ball shroud 21 and the universally movable pendent or operating handle 22. Angular movement of the handle 22 causes corresponding movement in the glass mirror element 23.

In FIGURE 2 the remote control rearview mirror 11 is separated from the vehicle and core wires or cables 24 inside the sheaths 25 of the Bowden wire assemblies 19 are better understood. The base member 26 is seen slightly extended from the tubular escutcheon 20 and as will be later appreciated, the base element 26 is keyed into the tubular escutcheon 20 which impinges on grooves in the base member 26. Disassembly is accomplished by simple removal of the circlip 27 and the base member 26 with connected elements can then be axially withdrawn from the tubular escutcheon 20. The flange portion 28 of the tubular escutcheon 20 may be ornamentally embellished for recess, flush, or angle mount to the dash or other position inside the vehicle and from behind the dash it is threaded or secured by other fastener means well known in the art fixing the tubular escutcheon 20 in dash mounted position.

By reference to FIGURE 3 the actuator 13 is best understood inside the tubular escutcheon 20. The base element 26 lockably receives, as by crimping, the Bowden wire assemblies in 120 degree positions about its center and the center of the base element 26 is on the axis of the tubular escutcheon 20. As will be seen slotted pockets receive and clamp onto the ends of the sheaths 25 to provide compression holding buttresses for the sheaths 25 and which do not interfere but guide the lineal movement of the core wires or cables 24. An axial receptacle is provided in the base member 26 which provides a buttress and clearance guide for the axially extending compression spring 29. A flanged spring follower 30 is retained on the outer end of the spring. The outer face 31 of the follower 30 is conical and hemispherical protuberance 32 extends axially thereupon. A spherical actuator body 33, truncated at the base portion 34 and covered with a spherical resin shroud 21 in Teflon (supra) or other suitable resin is provided axially in the tubular escutcheon 20. The fit between resin shroud 21 and the tubular interior of escutcheon 20 seals the tubular portion against air leakage. Ferrules 35 or upsets on the terminal ends of wires 24 seat in spheroidal pockets 36 registrably located in the body 33 with respect to wire location in the base element 26 and the wires 24 nest in radial recesses 37 in the body 33 so as not to interfere with movement of the body 33 in universal relation in the tubular recess 38 in the escutcheon 20. The shroud 21 is deformable to provide a tight fit of over 180 degrees on the body 33. The body 33 at the base truncation 34 is provided with a central small depression 39 into which impinges the protuberance 32. The handle 22 extends axially and threadably into the body 33 so that the flange 40 secures shroud to the body 33. Assembly of wires 24 to body 33 is easily accomplished by depressing the spring 29, sliding the wires through radial recesses 37 to trap the terminal ferrules 35 in the pockets 36 and releasing the spring 29 thereby tightening the wires 24 in the entire system. Then the shroud 21 is snapped over the body 33 and the whole actuator assembly is axially inserted in the tubular portion 38 of the escutcheon 20 where it is keyed against rotation at 41 and secured against axial displacement by the circlip 27.

In FIGURE 4 the inner construction of the mirror housing assembly 14 is best seen. The one-piece housing 18 includes a central pedestal 42 which extends into the housing recess 43 and to which the male spherical connector piece 44 is secured. This is keyed as at location 45 for proper orientation of the spider arms 46 which extend radially therefrom at 120 degree increments to receive the Bowden wire assemblies 19 and to specifically grip and hold the sheath portions 25 at the ends thereof in crimped buttressed relation. The threaded fastener 47 is passed axially into the pedestal 42, and secures the connector 44 in proper relation to the pedestal as by key 45. The connector 44 is provided with a spherical surface 48 which nests in a mating female socket 49 integrally and centrally provided in the mirror case 50. The mirror case 50 is made of a relatively deformable resin material and retains, as by discontinuous lips 51, the mirror glass 23 urging the mirror 23 into support contact with the button-like cushion extensions 53. Hence the case 50 secures the glass 23 in snap assembly compression relation. Apertures 54 flanking the socket boss portion 55 are in 120 degree apart registering relation to the pockets 46 in the connector 44. The wire or cable cores 24 are thus passed through the apertures 54 and radially through the slots 56 so that the ferrules 57 on the ends of the cable or wire core pieces are nested in hemispheric pockets 58 on the inner face of the case 50. Access to the fastener 47 is through the central clearance opening 59 in the case 50. When the cables or wires 24 are tensioned the dish shaped case 50 is drawn into universal movement snug relationship on the male spherical surface 48 of connector 44 and as the handle 22 of the remote actuator 13 is moved corresponding movement occurs in the mirror 23 and case 50. By reference to the FIGURE 6 it will be seen that two guideposts 60 and 61, flank the pedestal 42 in the housing 18 and registrably extend into the slots 62 and 63, respectively, through the web portion of the case 50, thereby stabilizing the case 50 and mirror glass 23 against displacement in all positions of movement and against rotational tendencies resulting from the non-symmetrical design of mirror 23 and case 50.

By reference to FIGURES 5 and 6 the structural simplicity and ease of assembly and disassembly of the remote control structure can be appreciated. In FIGURE 5 the tubular escutcheon 20 provides the mounting base for the entire actuator assembly 13. The wires or cables 24 with their terminal ferrules or balls 35 are passed through the base element 26 through the wire clearance slots 64 so that the ends of the sheaths 25 seat in the receptacles 65 where they are gripped firmly as by crimping. The wires 24 are then passed into the radial slots 37 in spherioidal body 33 and the ferrules 35 are seated in the spherical pockets 36 and retained there by tension in the system imparted by the spring 29 acting on follower 30 to urge separation as between base member 26 and body 33. Then the shroud 21 is snapped over the body 33 concealing and preventing all escape of wires 24 from the body 33 and presenting a resin faced ball having a close working fit in the tubular recess 38 of the escutcheon 20. Hence, the resin faced ball comprising body 33 and shroud 21 effectively closes the tubular escutcheon 20 from air leaks and noises. The assembly actuator 13 is then inserted in the recess 38 where the base element 26 is keyed at 41 against rotation. The circlip 27 is snapped into position reaching through the radial openings 66 in the escutcheon 20 and seating in the recesses 67 to secure the base against axial displacement. Disassembly is equally simple upon removal of the circlip. 27.

In FIGURE 6, at the mirror end, the one-piece mirror housing 18 is secured to the vehicle and the Bowden wire assemblies 19 of sheaths 25 and cores 24 with the terminal ends of the core wires 24 in ferrules upsets or balls 57 and are passed through the opening 68 and into the cavity 43 of the housing 18. The terminal ends of the sheaths 25 are seated in the sheath pockets in the spider arms 46, the wires 24 passing through the slots 69. Then the balls 57 are passed through the openings 54 in the case 50, are moved radially inwardly through the wire slots 56 and seat in pockets 58. Tension on the cables or wires 24 assure this seating and the case 50 is then urged into spherical socket relation on the male spherical surface of the connector 44. The fastener 47 is passed through clearance opening 59 in case 50 and through the connector 44 to the pedestal 42 and in proper orientation by keying at 45. When thus assembled the guide pins 60 and 61 project into the slots or apertures 62 and 63 respectively in the case 50. As the case 50 is shifted in position by movement of the actuator at least one of the pins 60 and/or 61 provides stabilizing control. Peripherally located lips 51 in the peripheral flange of the case 50 are deformable so as to allow the glass 23 to be snapped into place for secure retention and the back side of the glass 23 is thereupon selectively compressed and the glass 23 is cushioned in place by the cushion elements 53 integrally molded into the case 50.

This assembly accomplished at either or both mirror and actuator end, allows maximum freedom in automotive assembly procedures so that the Bowden wire assemblies 19 may be positioned in the automotive structure where desired and the spring 29 allows adequate slack in the wires 24 for assembly. Upon assembly the spring 29 distributes the tension equally in all of the wires 24. The buttresses of the connector pockets 46 and base sheath receiving pockets 65 assure that the sheaths 25 are maintained in a compressed relation desirable for best operation. The actuator handle 22 on its ball 21, 33 and connections thereto is allowed freedom to axially float in the tubular escutcheon 20 and the projection of the ball shroud 21 from the escutcheon flange 28 assures a maximum amount of traverse. This compensates for slight production variances in collective of individual cable lengths. Since the fit of the shroud 21 in the recess 38 is close the axis position of the body 33 of the actuator 13 is always held and the control ball 33 is merely shifted inboard or outward in the sleeve recess 38 accommodating wire length variations. Since shroud contact with the inside diameter of tubular escutcheon 20 is all that is required for axial control, the handle 22 at its contact with shroud 21 always projects into the vehicle so that the movement of the handle 22 is maximized. Where individual of the wires 24 vary in lengths the result is reflected in a deviation from center as between mirror 23 and handle 22, despite equal tension balance in the wires 24. When this occurs in most remote control systems, this reduces the angular amount of "throw" at the actuator because the pendant or handle 22 then engages the escutcheon flange. This is wholly avoided because the shroud 21 now projects outwardly from the escutcheon tube thereby allowing maximum throw of the handle 22 in excess of present traverse limits in the mirror 23 and thereby avoiding prior problems arising in production length tolerances in the wires 24 or the ferrule positioning.

The resultant structure brings the superior performance of the cable operated three vector remote control to the automotive industry in an improved form whereby easier service and installation is possible with minimum replacement elements and with increased stability at the mirror end making possible an asymmetric distribution of mirror mass, hence increasing the design range. Further, the one-piece mirror housing enlarges the capacity of remote control mirror systems to resist shock and vibrational tendencies which in automotive components occurs in every added element. The mirror case incorporating one of the pivot elements, the snap-in holding of the glass with cushion buttress and stabilizing apertures represent a substantial elimination of problems relative to case noise while integrating in a single element tension holding means and thereby minimizing clearance required as between housing and case and thereby simplifying production while extending the design perameters of glass to housing hitherto considered limited to symmetric design with balanced mass. The actuator effectively blocks intrusion of air and noise.

In the foregoing description the preferred embodiment of the present invention has been accurately described so as to be fully comprehended by those skilled in art. Upon examination modifications, changes and improvements will be preceived by those skilled in the art and such changes, modifications and improvements are intended to be included herein.

We claim:

1. In a cable operated remote control rearview mirror structure the combination comprising: a one-piece mirror housing including a center mounting pedestal and flanking spaced apart guide posts; a mirror support case of selectively deformable material pivotally secured to said pedestal and slotted and receiving said guide posts extending through said support case and restraining said support case from vibration contact with said housing, 2. The combination as set forth in claim 1 wherein said mirror support case includes an integral deformable resilient peripheral lip securing a mirror against displacement and a plurality of pressure pad elements engaging the back of said mirror and said lips and said pads thereby retaining said mirror in a cushioned compression grip.

3. The combination as set forth in claim 1 wherein said mirror support case includes a central spherical socket and control wire apertures in concentric location about said socket; a spherical mounting bearing on said socket portion of said support case and about which said case is pivotal and nesting in said socket portion of said case; and a fastener securing said bearing to said pedestal.

4. In a cable operated remote control rearview mirror structure: an actuator escutcheon tube; a base element including sheath clamp pockets and cable apertures keyed against rotation in one end of said tube; a circlip locking said base element against axial displacement in said tube; a ball shaped element truncated to form a flat on one side and having cable openings therethrough; a spring loaded element between said ball shaped element and base in point contact with the center of said flat in said ball shaped element; Bowden wire assemblies, the sheath portion of which are crimped into said clamp pockets in said base element and the core portions of which extend through said base element and to terminal connection with said ball element whereby said ball element depresses said spring loaded element to tension said core portions and the position of said ball element in said tubular escutcheon is a function of the length of said core portions and a part of the spherical surface of said ball element extends beyond the end of said tubular escutcheon opposite said base element; and a handle projecting outwardly from said protruding portion of said ball element.

5. A structure as set forth in claim 4 wherein said ball element is shrouded with a resin cover and wherein said ball element and said cover are together pivotable in close fit within said tubular escutcheon.

6. A remote control rearview mirror structure of the type comprising three tensioned core pieces of Bowden wire assemblies connected at one end to an actuator and at the other end to a mirror structure movable within a fixed housing including:

an actuator assembly in a tubular escutcheon, one element of which is a fixed base element compressibly receiving the sheaths of said Bowden wire elements the core pieces extending therethrough and a ball element axially located in said tubular escutcheon and to which said core pieces are attached, and a spring urging separation as between said base element, said ball element partially extending from said tubular escutcheon and pivotal therein by means of an extending handle; and a mirror assembly remote from said actuator assembly being a one-piece rigid housing with an integral center pedestal and flanking guide pins, said pedestal pivotally supporting a mirror case and said guide pins extending into and stabilizing said case while not interfering with the movement of said case about said pivot, said case having securing means in tensioned connection to the terminal ends of said core pieces of said Bowden wire assemblies;

a mirror element in said case compressibly secured by integral peripheral lips against cushions integrally formed in said case, and connector means in said housing compressibly receiving the terminal ends of the sheaths of said Bowden wire assemblies.

References Cited

UNITED STATES PATENTS

| | | | |
|---|---|---|---|
| 1,630,217 | 5/1927 | Rasor. | |
| 1,810,625 | 6/1931 | Rouse | 74—563 |
| 3,000,263 | 9/1961 | Milton et al. | 74—501 |
| 3,046,841 | 7/1962 | Kawecki | 74—501 |
| 3,191,455 | 9/1965 | Fuqua et al. | 74—501 |
| 3,195,370 | 7/1965 | Smith | 74—501 |
| 3,205,727 | 9/1965 | Sevrence | 74—501 |
| 3,369,427 | 2/1968 | Brighton et al. | 74—471 |
| 3,388,607 | 6/1968 | Stöber et al. | 74—191 |

FOREIGN PATENTS 398,216   2/1966   Switzerland.

MILTON KAUFMAN, Primary Examiner

U.S. Cl. X.R.

248—241; 350—289